United States Patent [19]

Haas

[11] Patent Number: 4,900,929
[45] Date of Patent: Feb. 13, 1990

[54] RADIATION DETECTION DEVICE

[75] Inventor: Luis-Dieter Haas, Heilbronn-Biberach, Fed. Rep. of Germany

[73] Assignee: Licentia Patent-Verwaltungs GmbH, Frankfurt, Fed. Rep. of Germany

[21] Appl. No.: 269,455

[22] Filed: Nov. 9, 1988

[30] Foreign Application Priority Data

Nov. 11, 1987 [DE] Fed. Rep. of Germany ....... 3738263

[51] Int. Cl.$^4$ ................................................. G01J 5/30
[52] U.S. Cl. .................................. 250/338.1; 250/349
[58] Field of Search ............... 250/338.1, 352, 370.15, 250/338.4, 349, 372, 206; 324/65 R

[56] References Cited

U.S. PATENT DOCUMENTS 4,246,480 1/1981 Clark ................................... 250/349

FOREIGN PATENT DOCUMENTS 3431994 4/1985 Fed. Rep. of Germany .
0004829 1/1985 Japan ................................. 250/338.1
1264277 2/1972 United Kingdom .

OTHER PUBLICATIONS

Köhler et al., Funkschau-Arbeitsblatter 21-1985, pp. 55-56-57-58.

Primary Examiner—Janice A. Howell
Assistant Examiner—Richard Honig
Attorney, Agent, or Firm—McGlew & Tuttle

[57] ABSTRACT

A radiation detector device is provided with a plurality of radiosensitive bipolar resistor elements arranged in parallel between two supply lines. Separate first signal lines are connected to a first pole of each of the resistor elements and leads out of the vacuum housing. For the reduction of the number of cable inlets, a ground cable acting as a second signal line is connected to one pole of each of the detector elements. A differential amplifier is provided associated with each of the detector elements receiving the signals from each of the first poles of the resistor elements and receiving the signal from the ground cable.

8 Claims, 1 Drawing Sheet

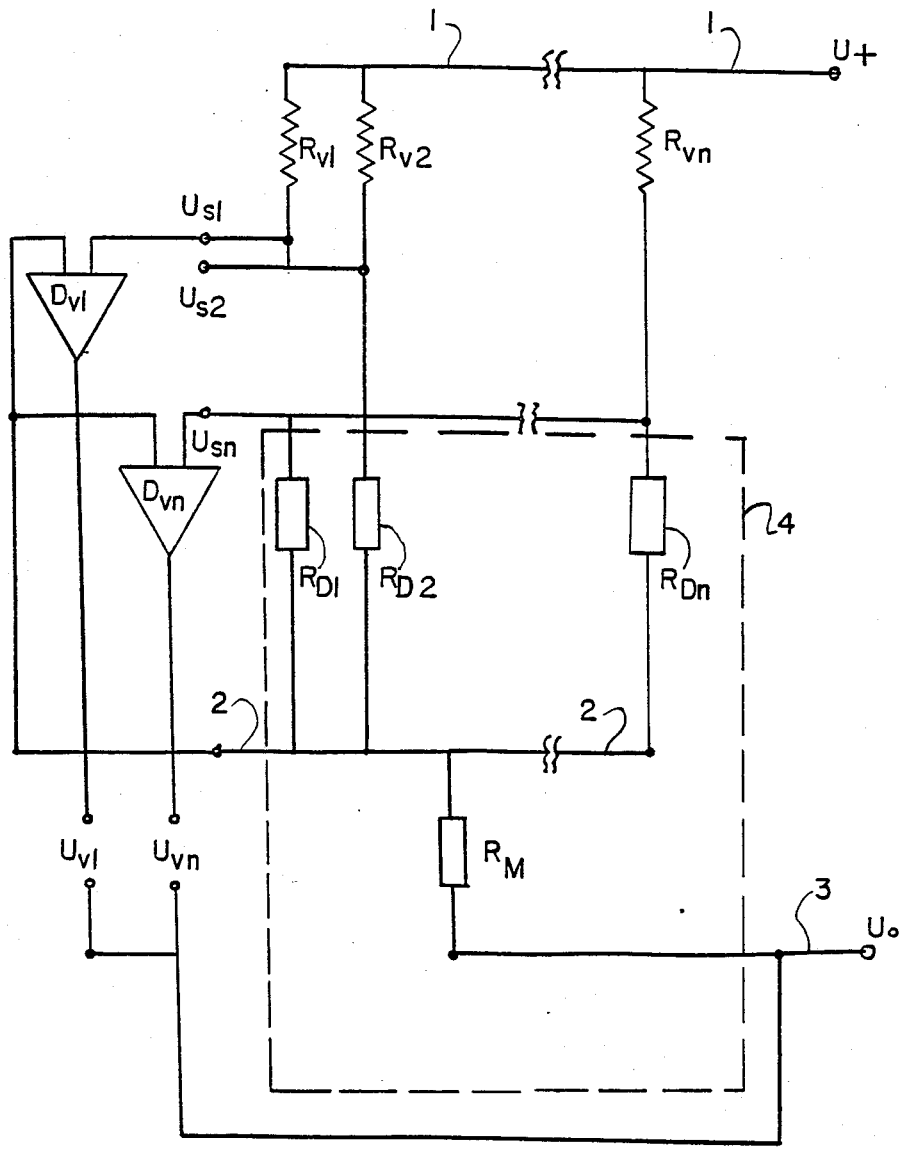

RADIATION DETECTION DEVICE

FIELD AND BACKGROUND OF THE INVENTION

The present invention relates to a radiation detection device with a plurality of radiosensitive bipolar resistor elements which are arranged in a vacuum type housing. The resistor elements are arranged in parallel with respect to two supply lines and are connected with at least one of their respective poles to a signal line.

Such detector devices are particularly sensitive to infrared radiation and are for example used to produce heat images. The single detector elements consist of photoconductive resistors which are arranged preferably side-by-side in rows and in a vacuum-tight housing. During operation direct current flows through all elements. The pole or connection of each resistor element is connected to a signal line for the registration of the signal potentials which change due to the occurrence of radiation. The signal line leads out of the vacuum-tight housing. If the signal potential is taken from a supply line, the various signal potentials will be subject to reciprocal influence because of the unavoidable line resistance of the DC-leading supply lines. The cross-talk increases with the number of detector elements.

It has been suggested that in order to limit the cross-talk in detectors with a large number of elements, i.e. with 180 elements, sets of 5 elements are furnished with their own supply lines. A disadvantage would be the resulting larger number of supply lines leading into the housing. If even more detector elements, e.g. 288 elements are to be installed, the number of vacuum-tight cable inlets creates major problems.

SUMMARY AND OBJECTS OF THE INVENTION

The present invention provides a solution for the use of a larger number of detector elements even with smaller detector devices and for limiting the number of cable inlets even with a large number of elements.

According to the invention, a mutual ground cable is provided which is connected to one of the connections or poles of a resistor element as a further signal line. The other pole or connection of each of the resistor elements is connected to a first signal line. Each of the resistor elements is allocated a differential amplifier. One signal input of the differential amplifier is connected with one of the signal lines and the other signal input of the differential amplifier is connected to the mutual ground cable. The amplified signal potentials are taken between the respective signal outputs of the differential amplifier and a supply line.

According to another feature of the invention, the poles of the resistor elements are connected to the respective signal lines and to a supply line via a dropping resistor.

The detector elements or resistor elements are arranged within a vacuum-tight housing such that the ground cable and the supply lines lead out of the housing separately. The differential amplifier or differential preamplifiers are arranged outside the vacuum-tight housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a circuit diagram of the detection device according to the invention.

DESCRIPTION OF THE PREFERRED EMBODIMENT

In the following a preferred embodiment of the invention is described in detail with reference to the accompanying drawing.

Referring to the drawings, in particular, the invention embodied therein, includes a plurality of radio-sensitive bipolar resistor elements $R_{D1}$-$R_{Dn}$ which are arranged in a vacuum-tight housing 4. The resistor elements are arranged in parallel with respect to two supply lines 1 and 3. At one of the poles of the resistor elements, the resistor elements are connected to a signal line $U_{S1}$-$U_{Sn}$. Each signal line, which is connected to one pole of each of the resistor elements $R_D$, leads out of the housing separately. A mutual ground cable 2 is connected to the other pole of each of the resistor elements $R_{D1}$-$R_{Dn}$. This mutual ground cable 2 functions as a second or further signal line. Each resistor elements $R_{D1}$-$R_{Dn}$ has allocated a differential amplifier $DV_1$-$DV_n$. One signal input of each differential amplifier is connected with one of the signal lines for first signal lines $U_{S1}$-$U_{Sn}$ and the other signal input of each differential amplifier is connected to the mutual ground cable 2. The amplified signal potentials $U_{V1}$-$U_{Vn}$ are taken between the respective signal outputs of the differential preamplifier and one of the supply lines 3.

The detector has a multitude of detector elements $R_{D1}$-$R_{Dn}$, i.e. 288, which consist e.g. of tabular photoconductive resistors arranged in two rows on an insulation substrate. A dropping resistor $R_{V1}$-$R_{Vn}$ is connected in series with each detector element $R_D$. The serial connections of e.g. 288 $R_D$ and $R_V$ are parallel to each other and are supplied with direct current via the first supply line 1 and second supply line 3. The line resistance of the line 3 is called $R_M$. One of the poles or connections of each detector element $R_{D1}$-$R_{Dn}$ leads out of the vacuum housing 4 (shown in a dotted line) separately and is connected to a first signal line $U_{S1}$-$U_{Sn}$ each. 288 signal lines $U_S$ are provided for n=288 detector elements $R_D$. The other pole of each radiation sensitive, bipolar detector resistors $R_D$ is connected to a second signal ground cable 2, which is used for all detector elements and which is lead out of the housing 4 separately from the DC supply line 3.

According to the invention a differential amplifier $DV_1$-$DV_n$ is supplied for each detector element $R_D$. One of the signal inputs of each differential amplifier $DV_1$-$DV_n$ is connected to signal output $U_{S1} \ldots U_{Sn}$ of the respective detector element $R_{D1}$-$R_{Dn}$. The second signal input of all differential amplifiers $DV_1$-$DV_n$ is connected to the mutual signal ground cable 2, which connects the other poles of the detector elements $R_{D1}$-$R_{Dn}$ to each other. The differential amplifiers are outside the vacuum-tight housing 4 containing the detector elements. The DC supply lines for the differential amplifiers DV are not shown. As the amplifiers are outside the housing 4, however, the DC supply lines do not need vacuum-tight cable inlets.

The amplified output signals are then taken at the signal output of each of the amplifiers $DV_1$–$DV_n$, especially with regard to the supply line 3. The direct current voltage between the supply lines 1 and 3 for example is 5 V.

While a specific embodiment of the invention has been shown and described in detail to illustrate the application of the principles of the invention, it will be understood that the invention may be embodied otherwise without departing from such principles.

What is claimed is:

1. A radiation detector device comprising: a vacuum-tight housing; a plurality of radiosensitive bipolar resistor elements arranged in said vacuum-tight housing, said resistor elements being arranged in parallel with respect to two supply lines with each of said resistor elements having at least one of its respective poles being connected to a signal line, each signal line connected to a pole of a resistor leading out of the housing separately; a mutual ground cable connected to the other pole of each of said resistor elements, said mutual ground cable acting as a further signal line; a plurality of differential amplifiers corresponding to each of said radiosensitive bipolar resistor elements, each differential amplifier including a first input and a second input, the first input of each of said differential amplifiers being connected with one of the signal lines and the respective other signal input being connected to the mutual ground cable, the amplified signal potentials being taken between the respective signal outputs of each differential amplifier and one of the supply lines.

2. A radiation detector device according to claim 1, wherein: the poles of the resistor elements connected to the first signal line are connected to one of the supply lines via a dropping resistor.

3. A radiation detector device according to claim 1, wherein: the detector elements are arranged within the vacuum-tight housing and the ground cable and the second supply line lead out of the housing separately.

4. A radiation detector device according to claim 1, wherein: the differential amplifiers are each arranged outside of the vacuum-tight housing.

5. A radiation detector device comprising: a vacuum-tight housing; a plurality of radiosensitive bipolar resistor elements arranged in said vacuum-tight housing; a first supply line; a second supply line, each of said radiosensitive bipolar resistor elements being connected to said first and second supply lines in parallel; a plurality of first signal lines, each of said signal lines being connected to a first pole of each radiosensitive bipolar resistor element, each of said plurality of first signal lines leading out of the vacuum-tight housing separately; a mutual ground cable connected to a second pole of each of said radiosensitive bipolar resistor elements to provide a second signal line; and, a plurality of differential amplifiers, each differential amplifier being associated with a respective bipolar resistor element, said differential amplifiers being each connected to one of said plurality of first signal lines and being connected to said second signal line, the amplified signal potentials being taken between the respective signal outputs of the differential amplifier and the second supply line.

6. A radiation detector device according to claim 5, wherein: the poles of the resistor elements which are connected to the first signal lines are connected to the first supply line via dropping resistors.

7. A radiation detector device according to claim 5, wherein: the detector elements are each arranged within the vacuum-tight housing and the ground cable and the second supply lines lead out of the housing separately.

8. A radiation detector device according to claim 5, wherein: each of the differential amplifiers are arranged outside of the vacuum-type housing.

* * * * *